(12) United States Patent
Gordon

(10) Patent No.: US 7,069,218 B2
(45) Date of Patent: Jun. 27, 2006

(54) SYSTEM AND METHOD FOR DETECTION AND ANALYSIS OF AUDIO RECORDINGS

(75) Inventor: Goren Gordon, Rishon Le-Zion (IL)

(73) Assignee: Gordonomics Ltd., Herzelia Pituah (IL)

( * ) Notice: Subject to any disclaimer, the term of this patent is extended or adjusted under 35 U.S.C. 154(b) by 272 days.

(21) Appl. No.: 10/152,308

(22) Filed: May 20, 2002

(65) Prior Publication Data
US 2003/0097255 A1 May 22, 2003

(30) Foreign Application Priority Data
Nov. 20, 2001 (IL) .......................... 146597
Nov. 21, 2001 (WO) ............... PCT/IL01/01074

(51) Int. Cl.
*G10L 15/00* (2006.01)

(52) U.S. Cl. ........................ 704/270; 704/271
(58) Field of Classification Search ............. 704/270, 704/271
See application file for complete search history.

(56) References Cited

U.S. PATENT DOCUMENTS

| | | | | |
|---|---|---|---|---|
| 6,151,571 A | * | 11/2000 | Pertrushin | .......... 704/209 |
| 6,275,806 B1 | * | 8/2001 | Pertrushin | .......... 704/272 |
| 6,563,532 B1 | * | 5/2003 | Strub et al. | .......... 348/158 |
| 6,705,990 B1 | * | 3/2004 | Gallant et al. | .......... 600/300 |

* cited by examiner

*Primary Examiner*—Daniel Abebe
(74) *Attorney, Agent, or Firm*—Wolf Greenfield & Sacks P.C.

(57) ABSTRACT

A system and method for detection and analysis of audio recording is disclosed. The method comprises receiving an audio recording, calculating complexity values of audio recording received, comparing the complexity values within an audio recording, and displaying analysis of audio recording on a user interface. The system comprises an input device an input device for receiving audio recording, a computing device for calculating complex values of received audio recording, a comparator device for comparing complex values of audio recording, and a storage device for storing internal data.

6 Claims, 1 Drawing Sheet

SYSTEM AND METHOD FOR DETECTION AND ANALYSIS OF AUDIO RECORDINGS

CROSS REFERENCE TO RELATED APPLICATIONS

This application claims priority from PCT Application No. PCT/IL01/01074, filed Nov. 21, 2001, and Israeli Patent Application No. 146597, filed Nov. 20, 2001, each of which is hereby incorporated by reference as if fully set forth herein.

BACKGROUND OF THE INVENTION

The present invention relates to the detection and analysis of audio recordings, in general, and to the detection and analysis of human audio recordings, in particular.

Listening to people conversing regardless of the contents of the conversation can be very informative regarding the state of mind the conversing parties are in. A speaker raising his voice significantly in comparison to normal manner of speech can indicate stress, anger or other exceptional inconvenience. Similarly, a speaker talking significantly slowly compared to normal can indicate some distress or fatigue of the conversing speaker. Eavesdropping, though invading the privacy of speakers, is performed for various reasons. One reason is for protecting society from suspected felons such as drug traffic, mass suicide assassins, etc. Another use for eavesdropping can be medical tracing of mentally ill patients. Eavesdropping for military purposes is probably the most widespread use made of eavesdropping. Military necessity for detailed information regarding the arsenal, ammunition and all military equipment as well as the need to acquire information regarding movements, concepts and thoughts of opponent armies and other defined elements led to the extensive use of eavesdropping as a legitimate tool for acquiring information. The extensive use of eavesdropping for military use provides a considerable amount of audio recordings. An audio recording received as such has little value prior to processing and extracting the information within the recording. Audio information extraction process can include a number of stages, a preliminary evaluation of the potential importance of information, a technical process that can include an audio replay and/or an audio replay providing enabling to inscribe the text in writing. The last stage includes the extraction of relevant information from the audio recording. Hence the process of extracting valuable information is time consuming and requires professional personnel. Infrequently when many hours of audio recordings accumulate not all recordings can be processed consequently valuable information is vanished. Furthermore, the duration of extraction of valuable information from audio recordings, also when not accumulated, can be critical. The situation of loss of valuable information due to the disability to process all audio recordings happens occasionally within military intelligence agencies responsible for eavesdropping. There is a growing need to prevent loss of valuable information concealed within unprocessed audio recording. Furthermore, there is need to evaluate on-line audio recordings for urgent purposes and for information of highly importance. There is a further need to provide an immediate alert when detecting an emergency situation or other urgent situation.

There is therefore a need in the art for a method and system for detection and analysis of audio recordings.

SUMMARY OF THE INVENTION

A system and method for detection and analysis of audio recording is disclosed.

The method comprises receiving an audio recording, calculating complexity values of audio recording received, comparing the complexity values within an audio recording, and displaying analysis of audio recording on a user interface.

The system comprises an input device an input device for receiving audio recording, a computing device for calculating complex values of received audio recording, a comparator device for comparing complex values of audio recording, and a storage device for storing internal data.

DETAILED DESCRIPTION OF PREFERRED EMBODIMENTS

Figure 1:
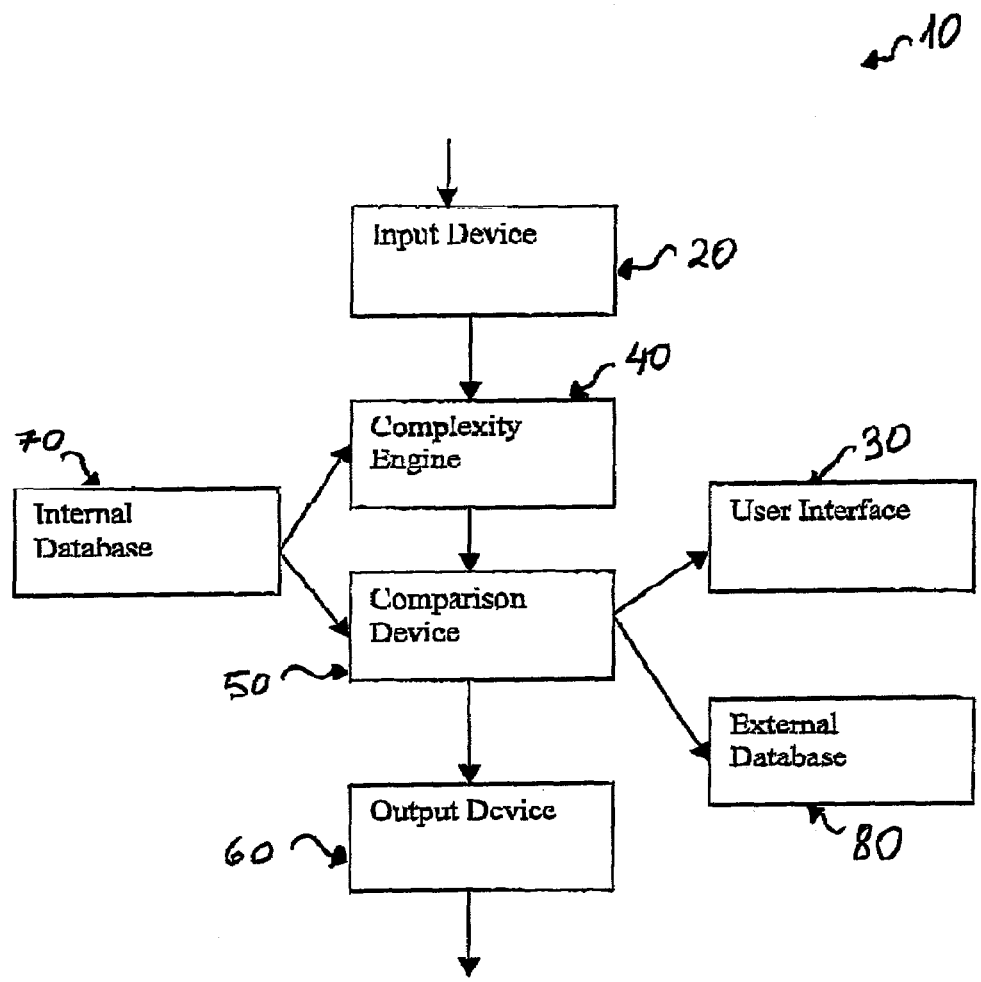
FIG. 1 illustrates a preferred embodiment of the present invention and particularly an audio detection and analysis system and method for detecting and analyzing audio recordings received by the system.

The present invention provides an audio detection and analysis system and method (ADAS) for detecting and analyzing audio recordings received by the ADAS. The present invention provides the use of the complexity data analysis (CDA) method presented within PCT Application PCT/IL01/01074, related patent application to the present invention, which is incorporated by reference. Thus, the present invention detects and analyzes audio recordings activating the CDA method providing valuable information prior to performing a time consuming audio recordings processing analysis. The use of the CDA method for detecting and analyzing valuable information for audio recordings is possible by exploiting a characteristic attribute of that each audio sound has and the possibility of the ADAS to characterize a normal complexity value for a known speaker within an audio recording. The complexity characteristic attribute value of a known particular speaker enables the ADAS to determine whether a known conversing speaker within any audio recording embraces the normal definition stored within the internal database of the ADAS. Furthermore, the ADAS can perform an online detection and analysis of speakers conversing within an audio recording.

The ADAS calculates and provides complexity values to voices recorded on the audio recording using the complexity engine as within PCT Application PCT/IL01/01074. The complexity engine prior to activating its process for providing complexity values draws relevant parameters from the internal database. A user at the user interface can insert parameters to the internal database. After the calculation of the complexity value of the audio recording, the comparison device with a parameter that contains the known complexity value of the particular speaker compares the complexity value. The ADAS can generate an alarm when the comparison result crosses a threshold provided by the internal database. The results of the detection and analysis is presented to the user at the user interface and stored within external database. The output device conveys the audio recording to the any predetermined destination such as an ordinary processing location. One skilled in the art can appreciate that in a similar manner the ADAS can detect and analyze on-line audio recordings as well. The ADAS will be better understood relating to FIG. 1.

FIG. 1 depicts a block diagram illustrating the ADAS, designated 10. The ADAS 10 includes an input device 20, a user interface 30, an external database 80, an output device 60, an internal database 70, a complexity engine 40 and a comparison device 50. The input device 20 is a device for receiving audio recordings. According to one preferred embodiment taken from the military intelligence field the input device 20 can be an audio receiver with a digital converter. According to the preferred embodiment the recording source is familiar to the user. The user interface 30 according to the present embodiment can include a screen (not shown) and an input device (not shown) such as a keyboard. The user, according to the present embodiment can indicate the source of the recording and can insert relevant parameters to the internal database 70. The internal database 70 conveys parameters, inserted by user as well as others (according to PCT Application PCT/IL01/01074), to the complexity engine 40. The complexity engine 40 activates the CDA on the recording and calculates its complexity value using parameters received from the internal database 70. The complexity value of the recording alongside with the recording is stored within the external database 80. The comparison device 50 compares the complexity value, provided by the internal database 70 as a parameter, with the calculated complexity value received from the complexity engine 40 (e.g. compares a new recorded conversation of the person to other known voice sound of the same person, thus alerting if he is excited, calm, etc.). The comparison device 50 further examines whether the complexity value of the input recording to threshold parameters provided by the internal database 70. The comparison device 50 generates an alert provided to the user interface 30. The comparison device 50 presents user interface 30 as well statistics of the current recording and other relevant recordings in the external database 80. One skilled in the art can easily percept that the above preferred embodiment can be either on-line or offline.

In another embodiment of the present invention a two recordings can be received by the ADAS on-line having their complexity value calculated parallel or one after another, as within the previous preferred embodiment. The complexity values provided by the complexity engine 40 of the incoming input recordings are compared to one another within the comparison device 50. The recording having the highest complexity value is marked as a more significant source for listening to on-line and accordingly an alert is sent to the user interface 30.

The person skilled in the art will appreciate that what has been shown is not limited to the description above. Those skilled in the art to which this invention pertains will appreciate many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. The invention, therefore, should not be restricted, except to the following claims are their equivalents.

What is claimed is:

1. A method for detection and analysis of audio recording, the method comprising:
  receiving an at least one audio recording;
  calculating an at least one first complexity values of the at least one audio recording received;
  comparing the at least one first complexity value with an at least one second complexity value displaying analysis of audio recording on a user interface.

2. The method of claim 1 wherein the at least one second complexity value is a a stored complexity value.

3. The method of claim 1 wherein the at least one second complexity value is a complexity value calculated from an at least one second audio recording.

4. A system for detection and analysis of audio recording, the system comprises:
  an input device for receiving an at least one audio recording;
  a computing device for calculating an at least one complexity values of the at least one audio recording received;
  a comparator device for comparing the at least one complexity value with an at least one second complexity value; and
  a storage device for storing internal database.

5. The system of claim 4 wherein the at least one second complexity value is a a stored complexity value.

6. The system of claim 4 wherein the at least one second complexity value is a complexity value calculated from an at least one second audio recording.

* * * * *